UNITED STATES PATENT OFFICE.

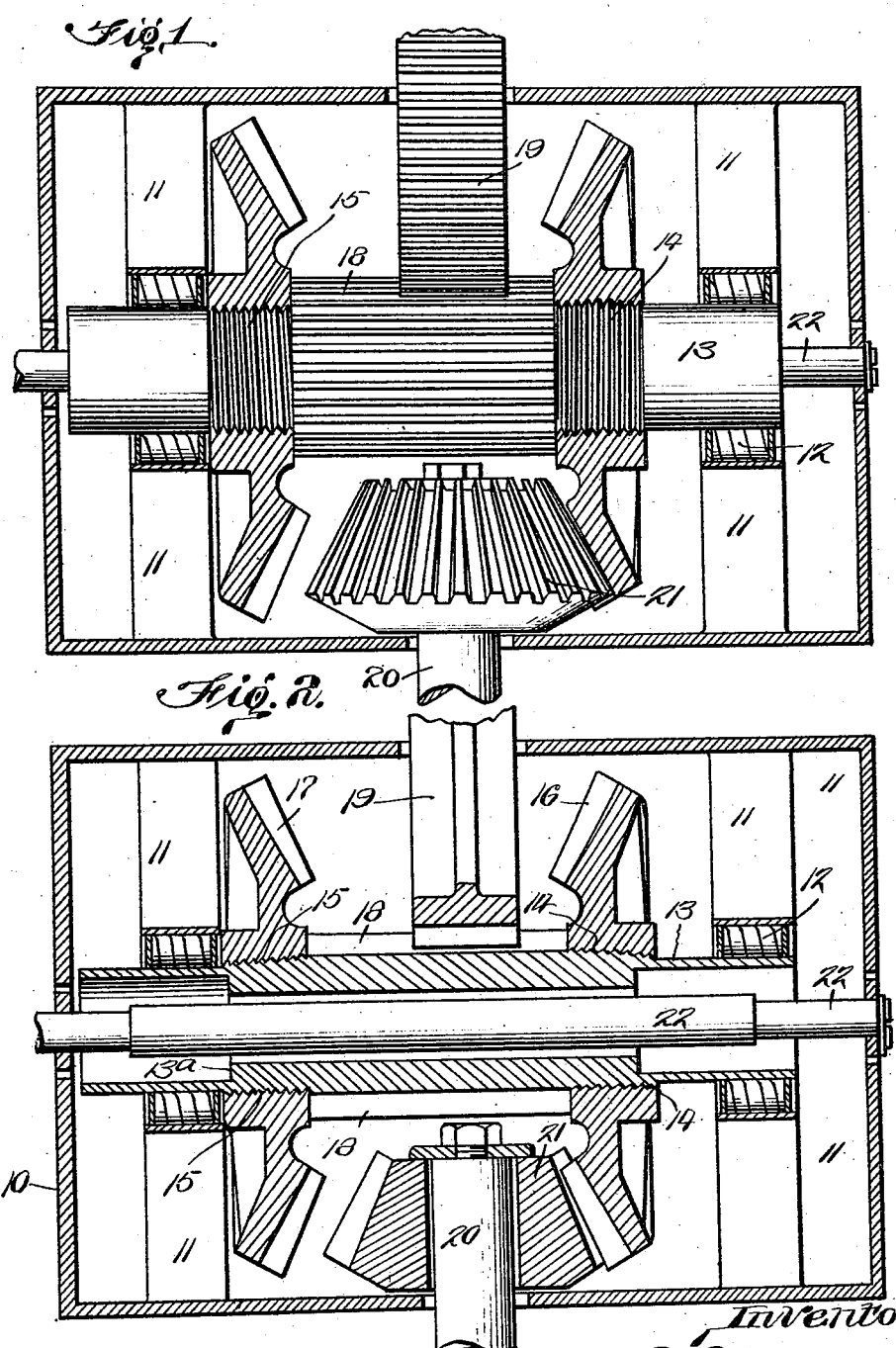

CLAUD E. MILLS, OF DES MOINES, IOWA.

REVERSE-GEAR STRUCTURE.

1,415,673.  Specification of Letters Patent.  Patented May 9, 1922.

Application filed July 8, 1919. Serial No. 309,411.

*To all whom it may concern:*

Be it known that I, CLAUD E. MILLS, a citizen of the United States, and resident of Des Moines, in the county of Polk and State of Iowa, have invented a certain new and useful Reverse-Gear Structure, of which the following is a specification.

The object of my invention is to provide a reverse gear structure of simple, durable and inexpensive construction. More particularly, it is my object to provide such a reverse gear structure, having the parts of novel construction and arrangement, whereby such parts may be quickly and easily assembled or taken part for purposes of repair or replacement.

With these and other objects in view, my invention consists in the construction, arrangement and combination of the various parts of the device, whereby the objects contemplated are attained, as hereinafter more fully set forth, pointed out in my claim and illustrated in the accompanying drawing, in which:

Figure 1 shows a sectional view through a gear casing in which is a reverse gear structure embodying my invention, part of the beveled gears being shown in horizontal section.

Figure 2 shows a central horizontal sectional view of my invention.

In the accompanying drawing, I have used the reference numeral 10, to indicate generally a gear casing, in which are the partition or frame members 11. Supported by the frame members 11 are races for roller-bearings 12. Slidably and rotatably supported in the roller-bearings 12, is a hollow hub 13. On the hub 13 between the respective sets of bearings 12 are screw-threaded portions, 14 and 15, and on said screw-threaded portions are screwed beveled gears 16 and 17, arranged opposite each other.

The portion of the hub 13 between the beveled gears 16 and 17 is provided with teeth 18 as illustrated in the drawing. Arranged in mesh with the teeth 18 is a gear 19, designed to be supported outside the gear casing, and to project through the wall of said casing, and to be in mesh with the teeth 18 in all of the slidable positions of hub 13.

Extended through the wall of the gear casing, 10, opposite the side through which the gear 19 is extended is a power shaft 20, on which is a beveled gear 21, detachably mounted and designed to mesh with the respective gears 16 and 17, depending on the position of the hub 13 in its slidable adjustment.

Mounted in the walls of the casing, 10, is a shaft 22 which is extended through the hub 13. My reverse gear structure herein shown, is designed to be operated by means of any suitable mechanism for imparting sliding movement to the hub 13, such for instance, as the mechanism shown in my Patent No. 1,355,346, issued October 12, 1920.

It will be understood that the hub 13 may be slid longitudinally for bringing the gear 16 or the gear 17 as may be desired to mesh with the beveled gear 21 on the power shaft 20, for thereby, imparting rotation in the desired direction to the gear 19.

The hollow hub 13, which is really a shaft, is provided with enlarged recesses at its ends, whereby there are provided the shoulders 13ª. The enlarged recesses, just mentioned, are adapted to receive some shifting mechanism, such for instance, as that shown in my prior patent.

The provision of the enlarged recesses, just mentioned, and the shoulders 13ª is necessary, in order to provide room for suitable devices and to provide engaging surfaces for thrusting the hub 13 endwise.

It will be seen that my reverse gear structure is a very simple construction, that the parts may be made in standard sizes by the best factory practise, and that they may be readily and easily assembled together or taken apart for purposes or repair or replacement. Some changes may be made in the construction and arrangement of the various parts of my improved reverse gear structure without departing from the essential features and purposes of my invention, and it is my intention to cover by my claim, any modified forms of structure or use of mechanical equivalents which may be reasonably included within its scope.

I claim as my invention:

In a device of the class described, spaced supporting members, a hollow hub slidably and rotatably mounted in said members, said hub having mounted therein spaced bevelled gears, having between said gears teeth, a gear meshing with said teeth, a bevelled gear adapted to mesh with either of said first bevelled gears or to be free from both in different positions of the sliding movement of said hub, said hub having near its ends, enlarged recesses with shoulders at their inner portions, a shaft extended through said hub and projecting therefrom at its ends, and means for supporting said shaft indpendently of said hub.

Des Moines, Iowa, June 11, 1919.

CLAUD E. MILLS.